F. RIESENBERG.
FOUNTAIN PEN.
APPLICATION FILED JULY 12, 1910.

1,050,295.

Patented Jan. 14, 1913.

Witnesses:

Inventor
Felix Riesenberg
By his Attorneys.

UNITED STATES PATENT OFFICE.

FELIX RIESENBERG, OF NEW YORK, N. Y.

FOUNTAIN-PEN.

1,050,295.  Specification of Letters Patent.  Patented Jan. 14, 1913.

Application filed July 12, 1910. Serial No. 571,564.

*To all whom it may concern:*

Be it known that I, FELIX RIESENBERG, a citizen of the United States, residing in the borough of Manhattan, city, county, and State of New York, have invented certain new and useful Improvements in Fountain-Pens, of which the following is a full and clear specification, illustrated by the accompanying drawings, the novelty of the invention being more fully pointed out in the annexed claims.

In the United States Letters Patent granted to me April 19th, 1910, numbered 955,205, I have described means for ascertaining the height of an opaque fluid in the reservoir of a fountain pen, the same comprising in brief, lenses longitudinally arranged in the wall of the font and arranged to focus light upon a wall or surface of contrasting color within the font.

The present invention relates to an improvement in this device with regard to the construction and arrangement of the contrasting walls or surfaces within the font, and consists in a fountain pen font having a lens or lenses substantially as shown and described in my said Letters Patent and having opposite each sight opening a surface of color contrasting with that of the writing fluid contained, consisting of a short preferably flat or substantially plane plate arranged diametrical of the font or substantially so and parallel to the lens or normal to the axis of the sight opening and preferably held in place merely by friction against the inner wall of the font.

Figure 1:
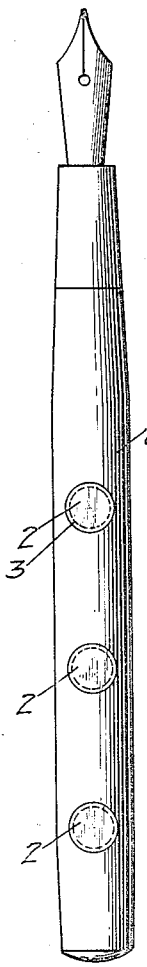
Figures 2, 3:
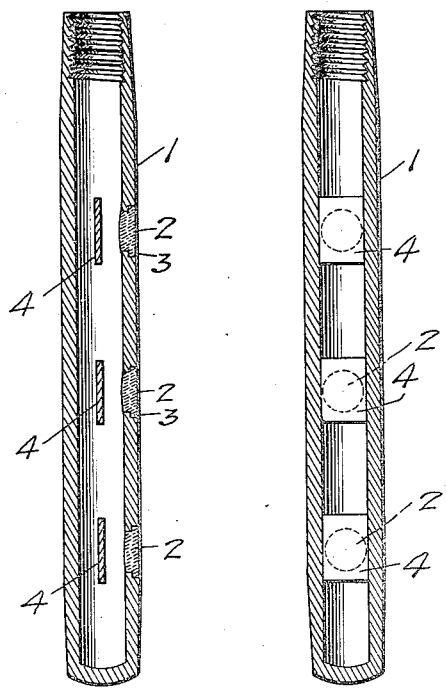
Figure 4:
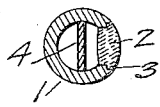

In the accompanying drawings Figure 1 is an elevation of a fountain pen embodying my invention. Fig. 2 is an axial sectional elevation taken in a plane at right angles with that of Fig. 1. Fig. 3 is an axial sectional elevation in a plane at right angles to Fig. 2, and Fig. 4 is a transverse sectional view through the font in a plane diametric of one of the lenses.

As stated in my Letters Patent for the purpose of ascertaining the amount of fluid contained in the font 1 of the pen, I employ a plurality of lenses 2, Figs. 1 and 2, which are arranged on the font in a row at suitable intervals as shown in Fig. 1. While these lenses may consist of any suitable material, I prefer a clear annealed glass with which I have obtained the best results. These lenses are preferably round and are preferably provided with a shoulder 3 near the outer face of the lens, as shown in Figs. 2 and 3, with which they rest in a suitably shaped opening in the wall of the font as shown in Fig. 2. The lenses may be cemented onto their seats by any kind of cement or similar material, however preferably by means of rubber cement which I find will keep the seats tight in spite of the slight expansion of the font by the heat when carried in the pocket. The shape of the lenses is preferably so that their outer face will conform with the outer surface of the font so that no crevices or grooves are produced at the joint between the glass and the font, in which dirt can collect. For this reason I have formed these lenses at their outer face cylindrical, that is to say, at all points parallel in the vertical direction with the axis of the font, while in the direction transverse to the font, the lenses are convex and conform with the cylinder formed by the font. The inner face of each lens is plane or very slightly convex or concave. It is obvious, however, that any other lens combination which is adapted to properly enlarge the image of the contrasting surface and focus light thereupon, is suitable for this purpose.

Immediately opposite each lens, the plate 4 is arranged. These plates are made of suitable material. I prefer an opalescent glass of color contrasting with the particular ink used in the font, as for example, white where a dark ink is used. In some cases red or other color may be preferred. These plates 4 are made of size to be slipped snugly into the greatest diameter of the font and be there held by friction against the walls of the font, and at right angles to a plane normal to its corresponding lens.

I have found in practice that the ink quickly runs off of the small surfaces of these plates and they are therefore quickly cleared of the opaque ink which would otherwise render them less efficient. A curved surface of considerable length would clear itself of ink so slowly as to be of little use. Being closer to the lenses which are focused upon them, the plates are more easily observed. They occupy very little space in the pen font and therefore do not materially decrease its capacity. They are easily installed and having flat surfaces, the light is more easily focused upon them. Once in place, they are firmly held by the friction of their side edges against the walls of the font and are not liable to dislodgment or cracking off.

What I claim is:

1. In a fountain pen, an ink font of opaque material having a sight opening in its side wall, and within it a longitudinal, substantially diametric and substantially plane plate of color contrasting with that of the ink to be contained in the pen and opposite and substantially normal to the axis of the sight opening.

2. In a fountain pen, an ink font of opaque material having a sight opening in its side wall, and within it a longitudinal, substantially diametric and substantially plane plate held by friction of its edges against the walls of the font, of color contrasting with that of the ink to be contained in the pen and opposite and substantially normal to the axis of the sight opening.

3. In a fountain pen, an ink font of opaque material having a longitudinal series of sight openings arranged in its side wall, and within it a series of longitudinal substantially diametric and substantially plane plates slightly exceeding in length the width of the sight openings, of color contrasting with that of the ink to be contained in the pen and opposite and substantially normal to the axes of the sight openings.

4. In a fountain pen, an ink font of opaque material having a longitudinal series of sight openings arranged in its side wall, and within it a series of longitudinal substantially diametric and substantially plane plates slightly exceeding in length the width of the sight openings, held by friction of their edges against the walls of the font, of color contrasting with that of the ink to be contained in the pen and opposite and substantially normal to the axes of the sight openings.

FELIX RIESENBERG.

Witnesses:
CLINTON H. BLAKE, Jr.,
M. G. CRAWFORD.